Patented July 21, 1942

2,290,401

UNITED STATES PATENT OFFICE 2,290,401

METHOD OF PREPARING POLYCYCLIC AROMATIC CARBOXYLIC ACIDS

Eugene D. Witman, Columbus, Ohio, assignor, by mesne assignments, to The Ohio State University Research Foundation, Columbus, Ohio, a corporation of Ohio No Drawing. Application July 23, 1941, Serial No. 403,759

4 Claims. (Cl. 260—515)

This invention relates to the preparation of polycyclic aromatic carboxylic acids, and more specifically, to the preparation of naphthalene-carboxyl derivatives, such as naphthyl-acetic acid.

An object of the invention is to prepare an aryl-acetic acid by reacting a halogenated aromatic hydrocarbon of the naphthalene, anthracene, and fluorene series with a Grignard metal to produce a Grignard reagent, and reacting the reagent with a halogen acetic acid.

Alpha-naphthyl-acetic acid is a plant hormone which is useful in stimulating root growth on plant cuttings and the like, and a major object of this invention is to synthesize such naphthyl-acetic acid by a novel process, comprising the formation of a naphthyl Grignard compound and reacting the same with chloroacetic acid, and treating the reaction product to produce and recover naphthyl-acetic acid or its salts; all of which are hereinafter described and claimed.

In the prior art, it has been proposed to react naphthalene directly with a halogen acetic acid to produce naphthyl-acetic acid. It has also been proposed to prepare this acid by first producing naphthalene methyl cyanides from their halogenated methyl naphthalenes, and then hydrolyzing the cyanides.

The present invention utilizes the Grignard reaction to produce at ordinary temperatures a Grignard reagent comprising essentially naphthalene magnesium bromide, (although the precise actual composition of any "Grignard reagent" is still in doubt) and then reacting such alpha-naphthyl Grignard (without isolating it from the solution) with chloroacetic acid, isolating the reaction product, and further treating it to produce naphthyl-acetic acid.

The broad reactions are probably as follows:

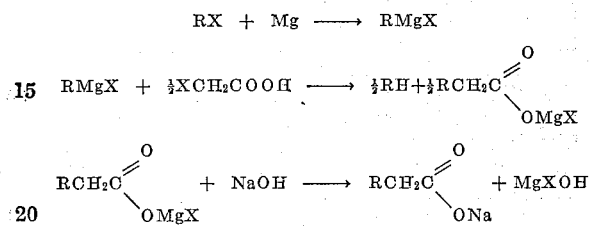

Where R is an aryl group, and X is a halogen.

The specific reactions utilizing bromo-naphthalene and chloroacetic acid are probably as follows:

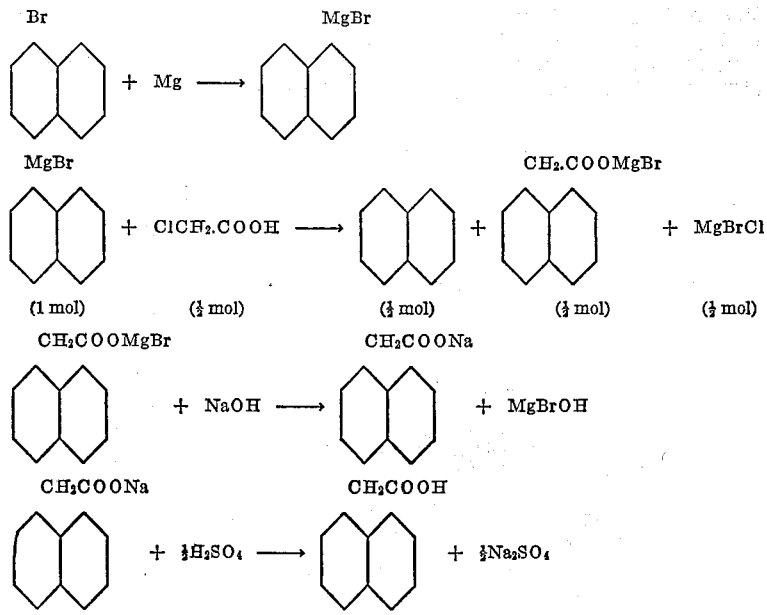

An example of the procedure is as follows:

2 mols (280 cc.) of alpha bromo-naphthalene are reacted with 2 mols (50 grams) of magnesium in 12 mols of ether to produce the Grignard "reagent." The Grignard reagent is prepared by suspending the magnesium metal in ether, adding a part of the aryl halide and a crystal of iodine or a few drops of an alkyl bromide, such as ethyl bromide, and heating to boiling. Presently the ethereal solution begins to turn a brown color which indicates the beginning of the reaction. The heat is removed and the balance of the aryl halide is added at such a rate as to cause gentle boiling of the ether. The reaction generates its own heat. The temperature is around 36° C. during the reaction. After the Grignard reagent is prepared, it is treated with a solution of 94 grams of chloroacetic acid in 250 cc. of ether. The addition of the ethereal solution of chloroacetic acid to the Grignard reagent causes an evolution of heat. Thus the temperature during the coupling of the Grignard reagent and the chloroacetic acid is also about 36° C. The rate of mixing is relatively unimportant throughout the procedure but the rate of addition is best done slowly in all cases since the reactions are all exothermic which cause the ether media to boil. If addition of reactants is too rapid, violent boiling of the ether results and the solvent is therefore lost. The ether is then distilled off and about 500 cc. of water acidified with a little hydrochloric acid is added to the residue. The precipitate is filtered and washed, and then resuspended in another 500 cc. of water together with 100 cc. of 43% caustic soda solution. It is brought to a boil, and filtered. The filtrate contains naphthyl-acetic acid as its sodium salt. The pure naphthyl-acetic acid may be recovered from the filtrate by treating with sulfuric acid, and may be purified by recrystallization from water. The impure naphthyl-acetic acid may alternatively be dissolved in dilute caustic soda solution, and reprecipitated with sulfuric acid.

From the above, it will be seen, that a new method of preparation of naphthyl-acetic acid is provided which may be carried out under the conditions usually performed in carrying out the ordinary Grignard reaction. Modifications of the process may be made without departing from the spirit of the invention. For example, any desirable method may be used for the preparation of alpha-bromo-naphthalene. Methods of obtaining halogenated naphthalenes are well known; methods for obtaining chloroacetic acid are well known also, and need not be detailed here. Iodine may be substituted for bromine in the mono-halogenated naphthalene starting product, bromoacetic acid may be used instead of chloroacetic acid, and other substitutions apparent to those skilled in the art may be used without departing from the spirit of the invention.

What I claim is:

1. The process of preparing naphthyl-acetic acid which comprises the steps of treating alpha-bromo-naphthalene with a Grignard metal in ethereal solution to form a Grignard reagent, reacting said reagent with chloroacetic acid, and treating the reaction product to recover naphthyl-acetic acid therefrom.

2. The process of preparing a naphthalene-acetic acid compound which comprises treating a halogenated naphthalene with magnesium and ether at room temperature to produce a Grignard reagent, and reacting the same with a halogenated acetic acid, and treating the reaction product with an alkali hydroxide to produce an alkali salt of naphthyl-acetic acid.

3. The process of preparing a naphthalene acetic acid compound which comprises treating a halogenated naphthalene with magnesium and ether to produce a Grignard reagent and reacting the same in ethereal solution with a halogenated acetic acid, treating the reaction product with an alkali hydroxide to produce an alkali salt of naphthyl-acetic acid, and treating the alkali salt with sulphuric acid to precipitate naphthalene-acetic acid.

4. The method of producing alpha-naphthalene-acetic acid which comprises reacting two mols of alpha-bromo-naphthalene with two mols of magnesium in 12 mols of ether $((C_2H_5)_2O)$ to form a Grignard reagent and treating the same with two mols of Grignard reagent to one mol of chloroacetic acid, distilling off the ether, adding acidified water to the remaining undistilled solution, filtering the precipitate, dissolving the filtered precipitate in aqueous caustic soda solution, boiling, filtering, and recovering alpha-naphthyl-acetic acid from the filtrate by precipitating the same with sulphuric acid.

EUGENE D. WITMAN.